United States Patent [19]
Cheng

[11] Patent Number: 5,390,503
[45] Date of Patent: Feb. 21, 1995

[54] RECOVERY AND RECYCLING SYSTEM FOR REFRIGERANT

[76] Inventor: Jung-Yuan Cheng, No. 22, Lane 210, Lin Sheng Road, Hsinchu City, Taiwan, Prov. of China

[21] Appl. No.: 150,457

[22] Filed: Nov. 10, 1993

[51] Int. Cl.$^6$ ............................................. F25B 49/00
[52] U.S. Cl. ........................................ 62/125; 62/149; 62/292; 62/475
[58] Field of Search .............. 62/149, 292, 125, 77, 62/129, 85, 475, 195

[56] References Cited
U.S. PATENT DOCUMENTS 4,476,688 10/1984 Goddard ........................ 62/292
5,099,653 3/1992 Major et al. ..................... 62/292
5,117,641 6/1992 Keltner ............................ 62/292
5,172,562 12/1992 Manz et al. ..................... 62/292
5,189,882 3/1993 Morgan, Sr. ..................... 62/292

Primary Examiner—John M. Sollecito
Attorney, Agent, or Firm—Ostrolenk, Faber, Gerb & Soffen

[57] ABSTRACT

This invention relates to a novel recovery and recycling system for refrigerant as well as the improved heat exchanger and refrigeration oil separator components. A sight glass, a temporary storage tank and two filters are added to the conventional system in order to raise the recovery and recycling speed to improve the quality of the recycled refrigerant.

6 Claims, 8 Drawing Sheets

RECOVERY AND RECYCLING SYSTEM FOR REFRIGERANT

FIELD OF INVENTION

This invention relates to a novel recovery and recycling system for refrigerant and improved heat exchanger and oil separator components to increase the recovery or recycling rate of a conventional recovery and recycling system.

BACKGROUND OF INVENTION

Due to the fast destruction of the ozone layer in the sky, which is caused by a Fluorochloride Compound (CFC) evaporating from the earth environment, over forty countries worldwide signed the Montreal Treaty in 1987 to prohibit further use of CFC and other related materials before the end of this century. Yet, despite an urgency to use the non-harmful replacement of R134a, many automobiles and other refrigeration devices still use the CFC like R-12 and R-22.

The Industrial Technology Research Institute of the Republic of China invented a Recovery and charging system for refrigerant (Taiwan Patent Publication No. 181617) for use in manufacturing factories, and is now also available for commercial use. However, such system has is proven to be ineffective due to the low recovery speed and the frequent breakdown of the compressor caused by over-heating. Subsequently, the manufacturing factories were forced, with a great degree of urgency, to seek a new replacement system.

After making numerous tests and large investments, a solution has been is reached that enables the applicant to double the speed of the recovery.

FIG. 1 is a the flow chart drawing of the recovery and charging system for refrigerant. The refrigeration and air conditioning system used in automobiles and elsewhere are omitted from the drawing. The refrigerant is recycled in the storage tank 10, and then is used to charge refrigeration and air conditioning units. The components of the system are indicated by particular reference numbers as follows: connecting tubes 20, a flow direction control device 30, a vacuum pump 50, a heat exchanger 60, an air vent device 70 and a dryer 80. The connecting tubes 20 include a low pressure inlet tube 21 and a high pressure inlet tube 22, through which refrigerant is sent to charge refrigeration and air conditioning systems (not shown) each of which consists of a compressor, a condenser, a dryer, an expansion valve and an evaporator.

The flow direction control device 30 is comprised of solenoid valves 31, 32, 33, 34, 35, 36, 37 and 38, and a check valve 39 provided between solenoid valves 32, 33, 34 and 36 to control the flow direction of the refrigerant. The control device 30 is connected to both the connecting tubes 20 and the storage tank 10.

The compression device 40 is comprised of a coil heat exchanger 99 and a compressor 42. A front oil separator 43 is provided between the coil heat exchanger 99 and a compressor 42 to separate the refrigeration oil mixed in together with the refrigerant. A rear oil separator 44 is provided after the compressor 42 to return the refrigeration oil in the refrigerant at the compressor outlet. The whole compression device 40 is connected to the flow direction control device 30. Vacuum pump 50 is also connected to flow direction control device 30 by means of a check valve 51 to suck out any uncondensable gas remaining in the refrigeration and air conditioning system. Air heat exchanger 60 is connected to the flow direction control device 30 and the compression device 40 respectively by a check valve 61. Another end of air heat exchanger 60 is also connected to the storage tank 10 by the flow direction control device 30.

Besides, another end of the air heat exchanger 60 is connected to the flow direction control device 30 by an expansion valve 62, and also to the storage tank 10 by a check valve 63, air vent device 70, a dryer 80 and sight glass 81. The expansion valve 62 reduces pressure and controls the flow more effectively when the charging refrigerant flows out of the storage tank 10. This allows the refrigerant to completely evaporate in the heat exchanger 60. The dryer 80 filters out contaminants, water or acid contained in the refrigerant, while the wet indicator on the sight glass 81 indicates whether the dryer needs to be replaced. The air vent device 70 is comprised of a pressure gauge 71, a pressure control switch 72, a solenoid valve 73 and a receiver 74, so that the remaining uncondensable gas in the refrigerant is expelled through the pressure control switch 72 and the solenoid valve 73. This prevents the gas from entering the storage tank 10.

SUMMARY OF THE INVENTION

As previously described, the applicant enhances the process and provides a more effective solution to the problem by taking measures of the following steps:

1. The structure of the coil heat exchanger 41 of prior art is re-designed so that the coil tube is two layers instead of one. By having a second layer, the heat exchange between the refrigerant coming from the rear oil separator 44 and those from an automobile is more effective than before. This ensures that the refrigerant has fully evaporated before it enters into the compressor. Otherwise, the liquid refrigerant will cause serious damage to the compressor, which has occurred frequently in the past.

2. The structure of the front oil separator 43 of the prior art is simplified to save costs to increase the filtering efficiency. Both the filters 432, 434 connected to the inlet pipe 431 and the outlet pipe 433 pass through the separation plate 435 (as shown in FIG. 4B), so that any oil or contaminants drop to the bottom of the separator and discarded. This prevents contaminants and dirty oil from back flowing to the outlet pipe 434.

DETAILED DESCRIPTION OF THE PREFERRED EMBODIMENTS

Figure 2A:
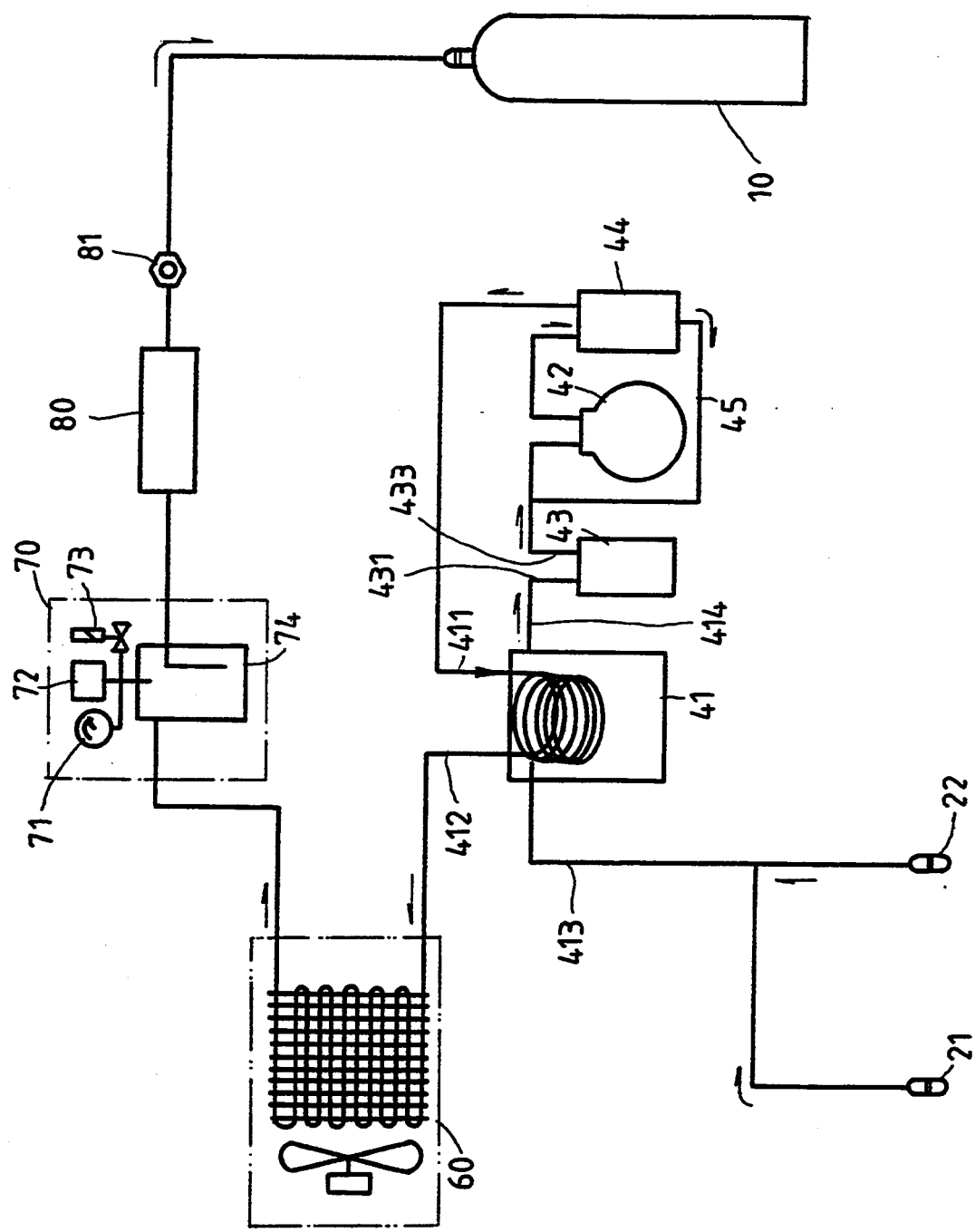
FIG. 2A is a schematic of the recovery apparatus of the invention.
Figure 2B:
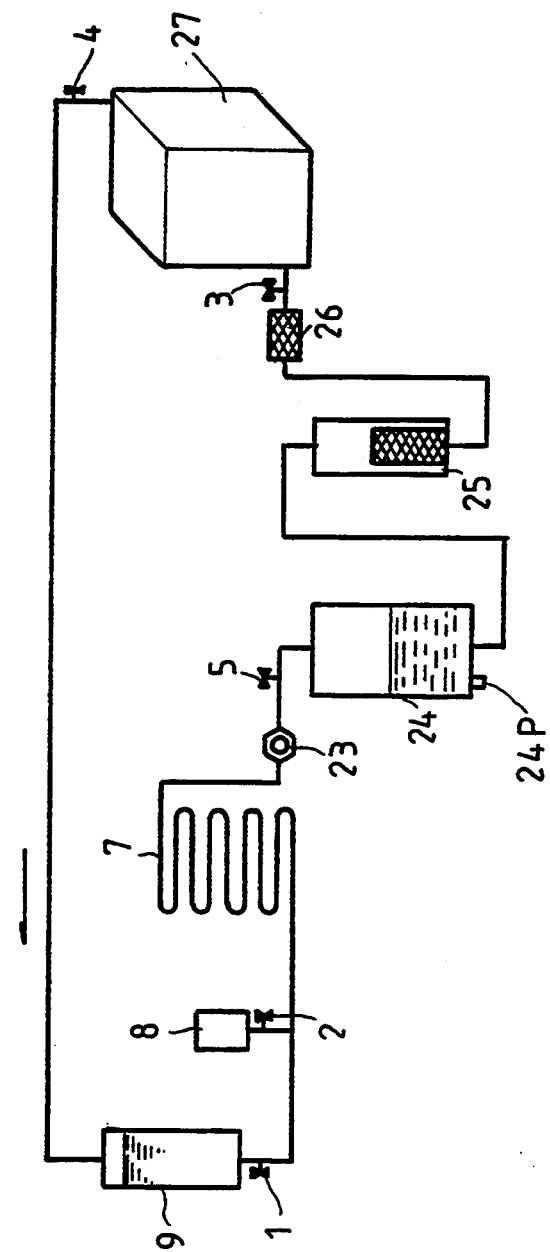
FIG. 2B is a schematic of the recovery and recycling system of the invention.

FIG. 2A shows the simplified recovery system of the instant invention, and the whole recycling system is contained in recycling apparatus 27 of FIG. 2B.

Figure 1:
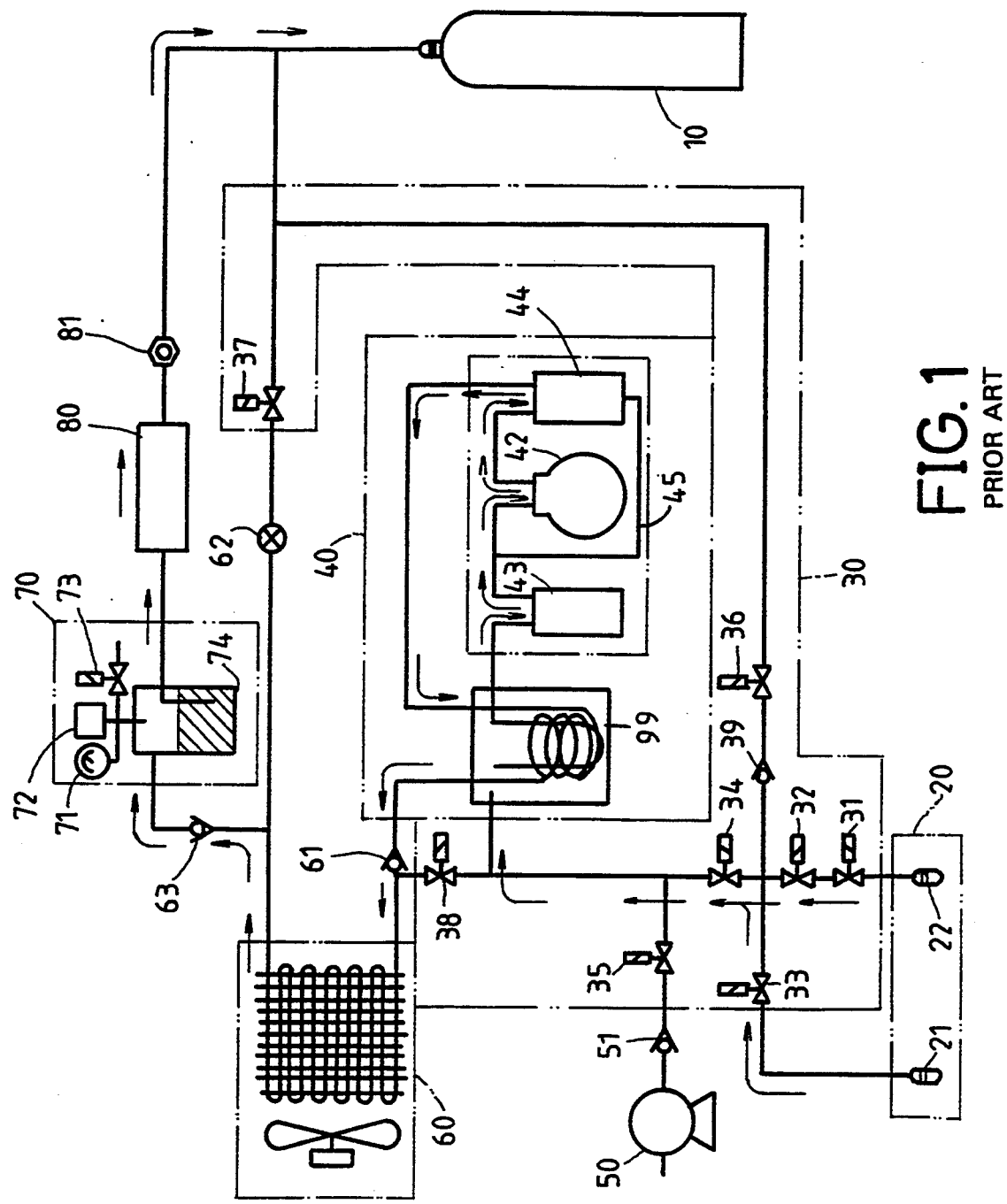
FIG. 1 is a schematic of a prior art recovery system.

Comparing the conventional system of FIG. 1 to the simplified system FIG. 2A of the invention (FIG. 2A), both solenoid valves and vacuum pump that are in the system of FIG. 1 have been omitted from the system of FIG. 2A. This reduces the cost while maintaining the same functions. For convenience, the corresponding numbers used to describe the prior art of FIG. 1 are also used to describe the instant invention and the functions of the components described in the prior art are also used for this invention.

The system of FIG. 2A per se can be used to recover refrigerant, however, to improve the quality of the recycled refrigerant, the system of FIG. 2B was invented the latter system (FIG. 2B), can also be used for both recovery and recycling of the refrigerant.

In the system of FIG. 2B there is a sight glass 23, a temporary storage tank 24, the first filter 25 and the second filter 26 are added and positioned consecutively to the low pressure inlet 21 or the high pressure inlet 22 as part of the improved system. The temporary storage tank 24 (preferably stainless) is provided after the sight glass 23, so that the recovery apparatus 27 (i.e. the assembly of FIG. 2A which is mounted on a portable cart that moves easily to the job site) can suck the refrigerant from low pressure inlet 21 leisurely. The refrigerant flows through the first filter 25 to filter out contaminants and then through the second filter 26 for a further filtering. The filter 25 is positioned vertically so that it can easily collect the dirt, once dirt has been collected, the two filters can be easily disassembled for recycling.

Referring to FIG. 2A, the refrigerant flows into the low pressure inlet 21 or the high pressure inlet 22 at a temperature of about 4° C. Then it flows into the coil heat exchanger 41 and is heated as vapor of about 20° C. Finally, it flows into the front oil separator 43. Any of the oil or dirt is then collected and discarded. However, dirt that remains on the pipe walls of the air conditioning system is cleansed away by the refrigerant or refrigeration oil that is also used as a good cleaning agent.

The evaporator or condenser 7 of an automobile is upstream of tank 24, and a sight glass 23 is provided to monitor the volume and cleanness of the refrigerant flowing through it. The mechanical properties of the air conditioning system can be examined to see whether it contains any air, water or lubricating oil. Different parts of refrigeration and air conditioning system can also be examined to see if it is damaged. For instance, if the piston ring is broken, lubricating oil will mix in with the refrigerant and that will change the color of the refrigerant. Accordingly, the owner of an automobile should check the air conditioning system when changing the refrigerant.

The vapor refrigerant first enters the compressor 42 to be compressed into a high pressure and high temperature vapor of about 58° C. Then it flows into the rear oil separator 44, after which the refrigeration oil that has been separated returns to compressor 42 through a pipe 45. The refrigerant then flows back to the coil heat exchanger 41 to heat the refrigerant coming from the low pressure inlet 21 or high pressure inlet 22. The refrigerant per se is cooled as liquid about 34° C. But after it has gone through the air heat exchanger 60, it cools down to 32° C., and vaporous refrigerant forms liquid completely. The air vent device 70 will then expel any air or uncondensable gas before the refrigerant flows through the dryer 80 to have the water content absorbed. Finally, it flows through another sight glass 81 to have the quality of refrigerant observed before it is stored in the storage tank.

R-12 rather than other chemicals is preferred to be used as a cleaning agent, for it is effective and can be recycled for future use.

The recovery system described above can also be used to recycle the evaporator or condenser of an automobile. This is done by adding several more valves to control the flowing direction of the refrigerant and the refrigeration oil. In FIG. 2B, a valve 1 is provided between a charging tank 9 and the evaporator 7, a second valve 5 is provided between the sight glass 23 and the temporary storage tank 24, and a valve 3 is provided between the second filter 26 and the recovery apparatus 27. A valve 4 is provided between the recovery apparatus 27 and the charging tank 9. Underneath a refrigeration oil charging tank 8 is connected to the valve 2 placed between the valve 1 and the evaporator 7.

The evaporator 7 is cleansed according to the following steps:

(A). valves 1 and valve 2 are closed, while valves 5, 3, 4 are left open, so that the pipe line between valve 1 and valve 3 can be vacuumed.

(B). valve 1 opens for about half a minute, so that the refrigerant can be sucked out quickly and stored in the temporary storage tank 24 due to negative vacuum pressure, then flows through the first and second filters 25 and 26 respectively, and finally into the recovery apparatus 27 to be recycled leisurely.

(C). After being recycled for three to five times, the cleanness of the evaporator 7 can be determined by means of examining the refrigerant through the sight glass 23.

(D). While the oil scum adhered to the walls of pipe line cannot not be washed out easily by the above steps, it can be further cleaned by the more effective refrigeration oil stored in charging tank 8, i.e. after repeating step (A), valve 5 is closed and valve 2 is opened to have the refrigeration oil sucked into the evaporator 7 and mixed with the oil scum, and then step (B) is repeated to let the refrigerant and oil scum enter into the recovery apparatus 27. Once it is inside, the recovery apparatus 27 starts to separate the refrigerant and the oil as described. Finally, the recycled refrigerant returns back to the storage tank 10 for future use.

Figure 3A:
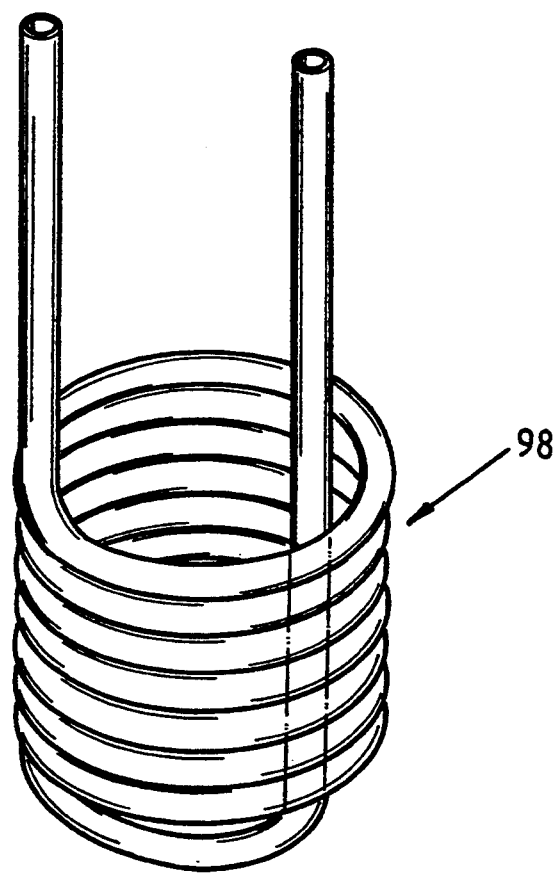
FIG. 3A is a perspective view of the improved coil tube contained in the heat exchanger of the prior art.
Figure 3B:
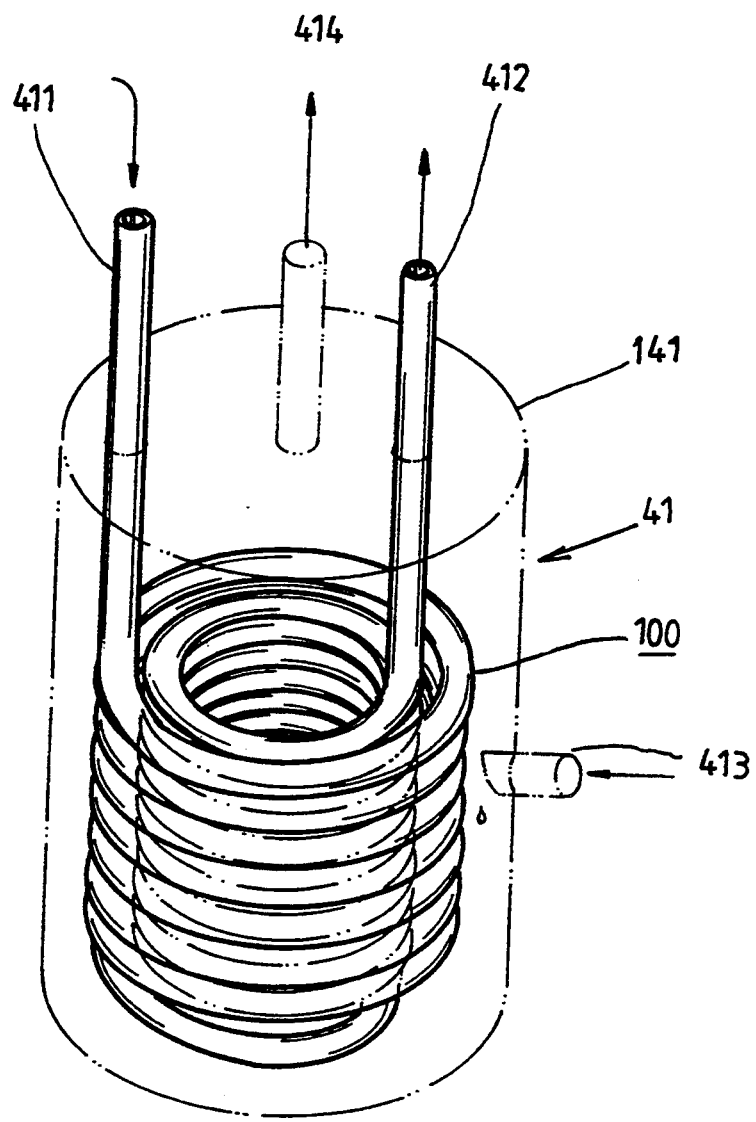
FIG. 3B is a perspective view of the heat exchanger of the invention.

FIG. 3A shows copper coil 98 of the coil heat exchanger 99 of the prior art (currently available in the market) having only one single layer. As seen in FIG. 3B, improved coil heat exchanger 41 includes copper coil 100 that contains a second layer of coil. That is, from inlet tube or pipe 411, coil 100 spirals downward to form an outer layer and then forms an upwardly spiraling inner layer that extends to outlet tube or pipe 412. The inlet pipe 411 from the rear oil separator 44 is connected to cylinder or tank 141 of the coil heat exchanger 41 at the top thereof, as is upwardly extending outlet pipe 412 A second inlet pipe 413 which comes from high pressure inlet 22 or 21 is provided on one side of the heat exchanger cylinder 141. Once fluid enters the heat exchanger 41 at inlet 413, the temperature of such fluid rises, and then the fluid flows out through the upwardly projecting outlet pipe 414 to front oil separator 43. This way, the heat exchange of this process is doubled, resulting in two effects:

1. The liquid refrigerant is heated sufficiently to vaporize before it enters into the front oil separator 43, for any liquid refrigerant will cause damage to the compressor.

2. The refrigerant entering the coil of heat exchanger 41 from the rear oil separator 44 is cooled to reduce the temperature of the whole system. Thus, breaking-down of the compressor due to over-heating can be prevented.

Figure 4A:
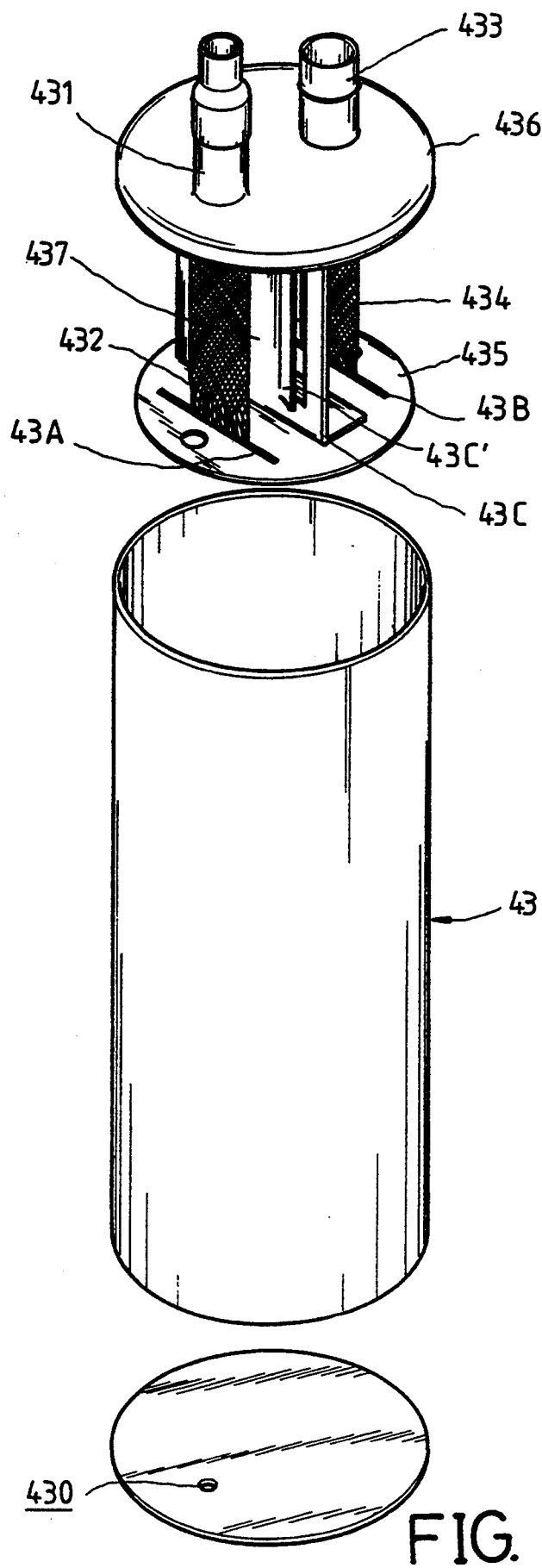
FIG. 4A is a perspective view of the front oil separator of the prior art.
Figure 4B:
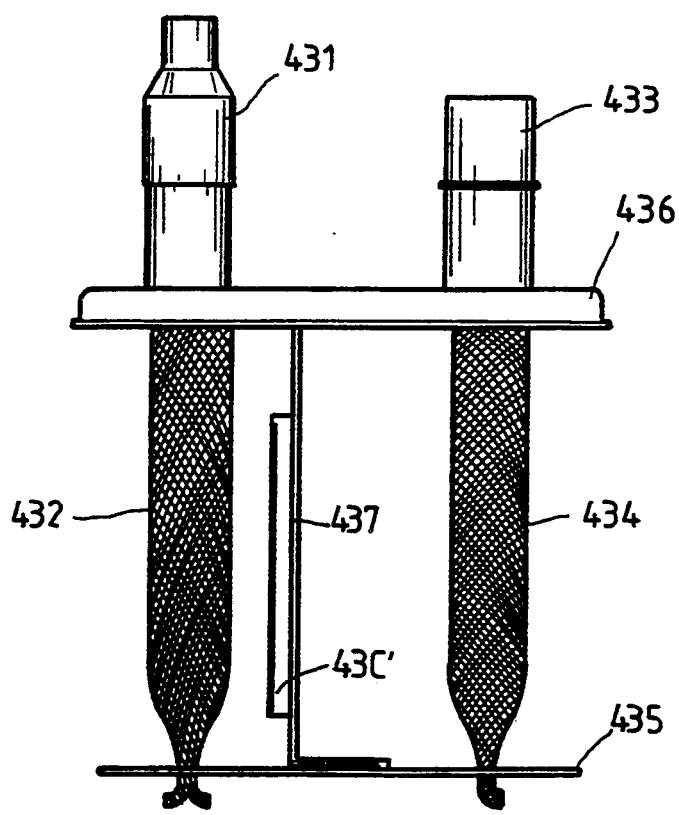
FIG. 4B is a side view of the upper part of the front oil separator of the invention.

FIG. 4A is a perspective view of the front oil separator 43 which is shaped like a cylindrical tank separated into an upper and a lower section by a separation plate 435 having two slots 43A and 43B. The upper section is further divided into a left and right section by vertical separation plate 437 (FIG. 4B) with two slots cut and pushed toward inlet side creating two vertical slots 43C and 43D (hidden) thereon, so that the refrigerant flowing through a filter pipe 432 cannot flow to the outlet side easily, and oil and contaminants may drop to the bottom of the tank after striking the cut-out pieces 43C' and 43D' (hidden).

Both the inlet tube 431 and outlet tube 433 of the front oil separator 43 are sheathed with the filter pipes 432 and 434 which are longer than those of the prior art and pass through the separation plate 435. The tail of the inlet tube 431 is turned upward so that the refrigeration oil can be dropped into more easily and stored at the bottom of the cylinder to be discarded through a hole 430. The tail of the filter pipe 434 is bent toward one side to prevent any oil or contaminants from returning into outlet. The length of the cylinder of the front oil separator 43 should be long enough to prevent surface of the accumulated oil from touching the tails of filter pipes 432 and 433, otherwise the oil may be carried to the compressor.

The function of the rear oil separator 44 is to return the refrigeration oil back to the compressor, so that it can function for a long period of time without having to supply new oil. Since the structure is conventional, a description is not included herein.

Furthermore, the effect of the front oil separator 43 is greatly increased. It should be noted that the installment of the front oil separator 43 is required, otherwise, the refrigeration oil may stay in the coil heat exchanger 41, for it will not be certain whether the refrigerant is a pure vapor or without refrigeration oil.

Figure 5:
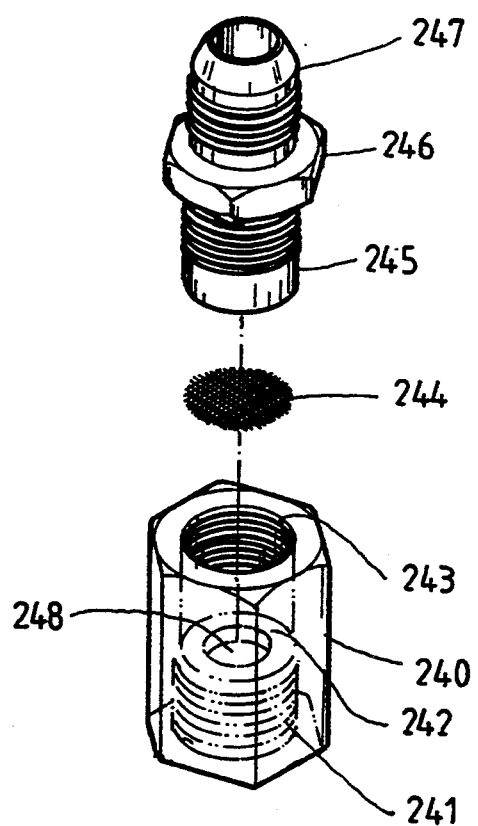
FIG. 5 is an exploded view of the filter.

FIG. 5 shows the structure of first filter 25 or the second filter 26. It is comprised of:

a screen-like filter disc 244, a body 240 with inlet inner female threads 243 and a hole 248 of the right diameter drilled through it, and a filter seat 242 provided at bottom of the hole;

a fitting 246 with male threads 245, 247 at the two ends thereof, and the filter 244 can then be fixed to one end, and the fitting can be dismantled to remove the filter for cleaning.

The recovery and recycling speed of the system can be controlled by using the body 240 with the hole 248 of various diameters. However, the diameter should be determined according to the power of compressor, the size of heat exchanger and oil separator.

When the liquid refrigerant flows into the temporary storage tank 24, it heats up instantly and evaporates, resulting in frequent explosions of the tank 24. Accordingly, a fusible drainage plug 24P is provided at the bottom of temporary storage tank 24. The plug is a screw axially drilled with a hole filled by fusible material such as tin. When the temperature of the tank 24 reaches 170° F., the plug will melt automatically to release the refrigerant contained inside, thus preventing an explosion.

The recovery speed of the prior art is about 300 g/min. Surprisingly, it is found that since all of the materials can be sucked out by the negative vacuum pressure in the stainless storage tank 24, and due to improved structure of the heat exchanger and front oil separator 43, the maximum recovery speed can reach up to 4 kilogram/min. The average speed, however, is about 600 g/min.

What is claimed is:

1. A recovery and recycling system for refrigerant that is received from outside cooling apparatus, said system comprising:

a tube having an inlet through which said refrigerant enters said system, a sight glass (23) operatively connected with said tube downstream of said inlet, a temporary storage tank (24) operatively connected with said tube downstream of said sight glass (23), a filter (25, 26) operatively connected to said temporary storage tank (24) downstream thereof, a recovery apparatus (27) downstream of said filter (25), (26) and operatively connected to receive refrigerant from said filter (25, 26), said recovery apparatus (27) comprising:

a heat exchanger (41), an inlet tube (21) operatively connected between said filter (25, 26) and said heat exchanger (99), a front oil separator (43) operatively connected with said heat exchanger (99) and downstream thereof, a rear oil separator (44) operatively connected with said front oil separator (44) and downstream thereof, a compressor (42) interposed between said oil separators (43, 44), an air heat exchanger (60) operatively connected with said heat exchanger (99) and downstream thereof, an air vent device (70) operatively connected with said air heat exchanger (60) and downstream thereof, a dryer (80) operatively connected with said air vent device (70) and downstream thereof, a storage tank (10) to receive refrigerant from said dryer (80), and another sight glass (81) interposed between said dryer and said storage tank;

said refrigerant that is received by said system from outside cooling apparatus being recycled by flowing through the tube and passed the sight glass (23) to have its color observed, and then flowing rapidly into the temporary storage tank (24) to be stored;

said refrigerant then being withdrawn from the temporary storage tank (24) and flowing through the filter (25, 26) which removes dirt from said refrigerant and then said refrigerant enters said recovery apparatus (27) through said inlet tube (21);

from said inlet tube (21) said refrigerant entering said heat exchanger (99) to be transformed into vapor which then flows through the front oil separator (43) that removes dirty oil which may be in said vapor;

thereafter, said vapor entering the compressor (42) to be compressed into a high pressure and high temperature vapor which is delivered to the rear oil separator (44) which returns refrigeration oil to the compressor (42), while the refrigerant flows from the rear oil separator (44) through the heat exchanger (99) and the air exchanger (60) where the refrigerant is transformed into a liquid;

said liquid flowing through air vent device (70) where air and uncondensable gas is expelled, then passed said another sight glass (81) where the color of said refrigerant that has been recycled is observed, and into the storage tank (10).

2. A recovery and recycling system for refrigerant according to claim 1, wherein the filter (25, 26) includes at least one filter unit comprising:

a filter (244);

a body (240) with an inlet having inner female threads (243), a hole 248 extending therethrough and a filter seat (242) provided at the bottom of the hole; and a fitting (246) with male thread sections (245), at opposite ends of said fitting (246) and the filter (244) can then be fixed to one end (245) of the fitting (246), and the fitting (246) can be dismantled to remove the filter (244) for cleaning;

whereby the recovery and recycling speed of the system can be controlled by selecting the body (240) with a hole (248) of appropriate diameter from a series of bodies having various diameters.

3. A recovery and recycling system for refrigerant according to claim 1, wherein a fusible drainage plug (24P) is provided at the bottom of the temporary storage tank (24), said plug (24P) having a characteristic such that when plug temperature exceeds 170° F., the plug (24P) will melt to release the refrigerant contained inside the temporary storage tank (24) to prevent an explosion thereof.

4. A recovery and recycling system for refrigerant according to claim 1, further comprising:

a first valve (1) and a charging tank (9), said first valve (1) being interposed between said charging tank (9) and an evaporator condenser (7) of outside cooling apparatus through which said refrigerant circulates;

a refrigeration oil charging tank (8) and a second valve (2) operatively connected between oil charging tank (8) and the evaporator condenser (7);

a third valve (3) is operative connected between the filter (25, 26) and the recovery apparatus (27);

a fourth valve (4) operatively connected between recovery apparatus (27) and the charging tank (9);

a fifth valve (5) operative connected between the sight glass (23) and the temporary storage tank (24);

said evaporator condenser being cleansed by conditioning the first through fifth valves according to the following steps (A) through (D) wherein:

(A) both said first valve 1 and said second valve (2) are closed, while the third, fourth and fifth valves (3, 4), and (5) are left open, so that pipe line sections between the first valve (1) and the third valve (3) can be vacuumed;

(B) open the first valve (1) for about half a minute, so that the refrigerant can be sucked out and stored in the temporary storage tank (24) due to negative pressure therein, then the refrigerant flows through the filters (25, 26), and finally into the recovery apparatus (27) to be recycled leisurely;

(C) after being recycled for three to five times, the cleanness of the evaporator condenser (7) can be determined by observing the refrigerant through the sight glass (23);

(D) since oil scum adhered to walls of the pipe line sections may not be washed out completely by the above-said steps (A) through (C), said walls can be further cleaned more effectively by refrigeration oil stored in the charging tank (8), i.e. after repeating step (A);

the fifth valve (5) is closed and the second valve (2) is opened, so that the refrigeration oil is sucked into the evaporator condenser (7) and mixed with the oil scum, and then step (B) is repeated to permit the refrigerant and the oil scum to enter the recovery apparatus (27); and once the refrigerant and the oil scum are inside the recovery apparatus (27), the latter separates the refrigerant and the oil as described, and finally recycled refrigerant returns to the storage tank (10) for future use.

5. A recovery and recycling system for refrigerant according to claim 1, wherein;

the coil heat exchanger (99) includes a cylindrical tank having, a first inlet pipe (411) through which refrigerant flows from the rear oil separator (44), a first outlet pipe (412) connected to the first inlet pipe (411), a second inlet pipe (413) on one side of the tank, and a second outlet pipe (414); whereby high temperature refrigerant flows into the tank through the first inlet pipe (411) and out through the first outlet pipe (412), and low temperature refrigerant flows through the second inlet pipe (413) and into the tank to be stored, and then is heated into a vapor and flows out of the tank through the second outlet pipe (414);

characterized in that the first inlet pipe (411) circulates downward to the bottom of the tank and then inward and upward to become the first outlet pipe (412), for increased transfer of heat from the refrigerant flowing between the first inlet pipe (411) and the first outlet pipe (412) to the refrigerant that entered the tank through the second inlet pipe (413).

6. A recovery and recycling system for refrigerant according to claim 5, wherein:

the front oil separator (43) includes a cylinder-like tank separated into an upper and lower section by a separation plate (435) having two slots (43A) and (43B), and the upper section is further divided into an inlet and an outlet section by another vertical separation plate (437) having two slots cut and pushed toward the inlet section creating two vertical slots (43C) and (43D) thereon, so that refrigerant flowing through an inlet filter pipe (432) in the inlet section cannot flow to the outlet section easily, and oil and contaminants may drop to the bottom of the cylinder-like tank after striking the cut-out pieces (43C') and (43D'); an inlet pipe (431) that enters the inlet section from the top and is sheathed with said inlet filter pipe (432), and an outlet pipe (433) sheathed with an outlet filter pipe (434) that is disposed in the outlet section and extends outward of the cylinder-like tank through the top thereof; and characterized in that:

the filter pipe (432) at its lower end passes through the slot (43A) of the separation plate (435) and is turned upward to allow oil and contaminants to drop to the bottom of the cylinder-like tank, and there is an outlet (430) provided at the bottom of the cylinder-like tank to discard dirty refrigeration oil, and one said outlet filter pipe (434) passes through the separation plate (435) it bends toward one side to prevent oil or contaminants from back flowing into the outlet pipe (433); and the cylinder-like tank having an overall height that is great enough to prevent the lower ends of the filter pipes (432), (434) from contacting touching accumulated oil at the bottom of the cylinder-like tank so that said accumulated oil is not carried back to the compressor (42) together with the refrigerant.

* * * * *